(12) United States Patent
Akoum et al.

(10) Patent No.: US 12,700,899 B2
(45) Date of Patent: Aug. 4, 2026

(54) ALLOCATION OF CHANNEL INFORMATION TRANSFER ENHANCING MASSIVE MIMO UPLINK IN SPLIT RAN DEPLOYMENTS

(71) Applicant: AT&T Intellectual Property I, L.P., Atlanta, GA (US)

(72) Inventors: Salam Akoum, Austin, TX (US); Aditya Chopra, Austin, TX (US); Milap Majmundar, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 834 days.

(21) Appl. No.: 17/869,904

(22) Filed: Jul. 21, 2022

(65) Prior Publication Data

US 2023/0344680 A1      Oct. 26, 2023

Related U.S. Application Data

(60) Provisional application No. 63/333,890, filed on Apr. 22, 2022.

(51) Int. Cl.
H04B 7/06          (2006.01)
H04B 7/0413          (2017.01)
(Continued)

(52) U.S. Cl.
CPC ......... H04B 7/0619 (2013.01); H04B 7/0413 (2013.01); H04B 7/0417 (2013.01);
(Continued)

(58) Field of Classification Search
CPC .. H04B 7/0619; H04B 7/0413; H04B 7/0417; H04B 7/0456; H04B 7/0617; H04B 7/0665; H04L 25/0224; H04W 28/06
See application file for complete search history.

(56) References Cited

U.S. PATENT DOCUMENTS

| | | | |
|---|---|---|---|
| 2010/0323612 A1 | 12/2010 | Xu et al. | |
| 2020/0266920 A1 | 8/2020 | Nammi et al. | |

(Continued)

FOREIGN PATENT DOCUMENTS

| | | | | | |
|---|---|---|---|---|---|
| WO | WO-2020242352 A1 | * | 12/2020 | ............. | H04B 7/024 |
| WO | WO-2022265713 A1 | * | 12/2022 | ........... | H04B 17/336 |

OTHER PUBLICATIONS

"Notice of Allowance received for U.S. Appl. No. 18/595,017, filed Jul. 1, 2025, 13 pages".

*Primary Examiner* — Tonia L Dollinger
(74) *Attorney, Agent, or Firm* — Guntin & Gust, PLC; Atanu Das

(57) ABSTRACT

Aspects of the subject disclosure may include, for example, a device having a processing system including a processor; and a memory that stores executable instructions that, when executed by the processing system, facilitate performance of operations including: receiving sounding reference signal (SRS) data for an uplink transmission of a user equipment (UE) from a remote unit (RU); generating SRS-based beam weights; transmitting the SRS-based beam weights to the RU; instructing the RU to generate DMRS-based beam weights and send demodulation reference signal (DMRS) channel estimates from subsequent uplink transmissions of the UE; and receiving the DMRS channel estimates from the RU. Other embodiments are disclosed.

20 Claims, 11 Drawing Sheets

(51) Int. Cl.

| | |
|---|---|
| *H04B 7/0417* | (2017.01) |
| *H04B 7/0456* | (2017.01) |
| *H04L 5/00* | (2006.01) |
| *H04L 25/02* | (2006.01) |
| *H04L 67/10* | (2022.01) |
| *H04W 28/06* | (2009.01) |

(52) U.S. Cl.

CPC ......... *H04B 7/0456* (2013.01); *H04B 7/0617* (2013.01); *H04B 7/0665* (2013.01); *H04L 5/0048* (2013.01); *H04L 5/0051* (2013.01); *H04L 5/0064* (2013.01); *H04L 25/0224* (2013.01); *H04W 28/06* (2013.01); *H04L 5/0053* (2013.01); *H04L 67/10* (2013.01)

(56) References Cited

U.S. PATENT DOCUMENTS

| | | | |
|---|---|---|---|
| 2023/0155864 A1* | 5/2023 | Abdoli | H04L 25/0204 370/329 |
| 2023/0275784 A1* | 8/2023 | Sayed Hassan | H04B 7/0617 370/252 |
| 2023/0344483 A1 | 10/2023 | Akoum et al. | |
| 2023/0354205 A1* | 11/2023 | Khoshnevisan | H04W 52/10 |
| 2024/0204840 A1 | 6/2024 | Akoum et al. | |
| 2024/0372600 A1* | 11/2024 | Schreck | H04B 7/0456 |

* cited by examiner

100

160

170

200

220

RECEIVE SRS DATA — 231

GENERATE SRS CHANNEL ESTIMATES — 232

No ◄— DETERMINE WHETHER TO SEND SRS CHANNEL ESTIMATES TO RU — 233

Yes

INSTRUCT RU TO CALCULATE DMRS CHANNEL ESTIMATES USING SRS CHANNEL ESTIMATES — 234

No ◄— DETERMINE WHETHER RU SHOULD SEND DMRS CHANNEL ESTIMATES — 235

Yes

PROCESS UPLINK USING DMRS CHANNEL ESTIMATES — 236

230

300

600

ALLOCATION OF CHANNEL INFORMATION TRANSFER ENHANCING MASSIVE MIMO UPLINK IN SPLIT RAN DEPLOYMENTS

RELATED APPLICATIONS

This patent application claims the benefit of U.S. Provisional Patent Application No. 63/333,890 filed Apr. 22, 2022, which is incorporated by reference herein in its entirety.

FIELD OF THE DISCLOSURE

The subject disclosure relates to allocation of channel information transfer enhancing massive multiple-input, multiple-output (MIMO) uplinks in split radio access network (RAN) deployments.

BACKGROUND

A split configuration, such as an open-RAN (O-RAN) specified fronthaul split (or any other lower, physical layer split), enables deployment of communication units across large geographic areas, where processing for those units is implemented in a centralized (e.g., cloud-based) system. A fronthaul split, in particular, allows network operators to deploy cheap and lightweight radio units (RUs) or open-RUs (O-RUs) on cellular towers that are connected to baseband processing systems (i.e., distributed units (DUs) or open-DUs (O-DUs)) via digital interface(s). The interface and messaging between a DU and an RU are openly specified in standards bodies, such as O-RAN. A major requirement for a fronthaul interface is the ability to exchange radio data via low throughput messaging while maintaining adequate communication performance. Extensive efforts were made to define the O-RAN split fronthaul message exchange format to ensure that communication performance is maximized at the lowest possible throughput.

BRIEF DESCRIPTION OF THE DRAWINGS

Reference will now be made to the accompanying drawings, which are not necessarily drawn to scale, and wherein.

DETAILED DESCRIPTION

Figure 1A:
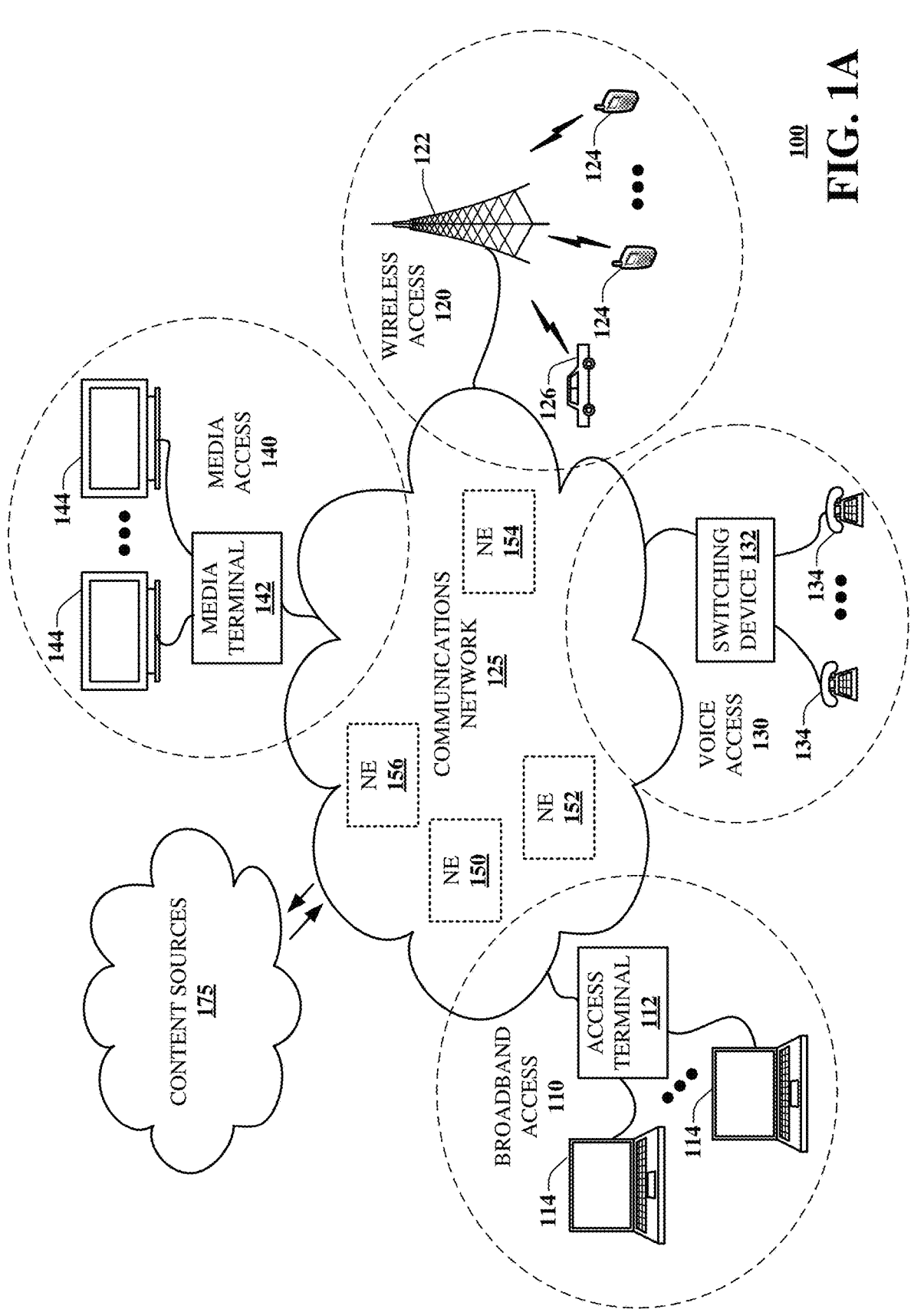
FIG. 1A is a block diagram illustrating an exemplary, non-limiting embodiment of a communications network in accordance with various aspects described herein.

Careful consideration needs to be made in the design and implementation of communication exchanges (e.g., how data is transferred, the type of data that is transferred, how often the data is transferred, and so on) between a DU and an RU in a split fronthaul configuration to ensure that the fronthaul interface is not overburdened. This is especially so in massive MIMO deployments where RUs may have numerous (e.g., 64, 128, etc.) antennas, and data for numerous user equipment (UEs) needs to be extracted from uplink signals (or "chains") for processing at a centralized baseband processor.

The existing fronthaul split, which is well defined in O-RAN, distributes uplink processing work between the O-RU and the O-DU at the beamforming stage. In particular, the RU performs beamforming of an uplink signal by multiplying a received signal with a beamforming matrix. Each column of the beamforming matrix may be referred to as a "beam," and the output of beamforming is a collection of signal streams that are sent over the fronthaul interface to the DU. In a typical fronthaul split configuration, beams are designed by the DU based on sounding reference signal (SRS) processing (i.e., channel estimates based on SRS data provided by UEs) and are communicated to the RU for use in a digital beamformer to process uplink signals. However, because the beams are generally designed by the DU prior to signal reception by the RU, the issue of beam aging arises. Specifically, some amount of time (e.g., milliseconds) would have passed between initial receipt of SRS data from a given UE and the eventual updating of the digital beamformer, and during this time, the channel between the UE and the RU may have changed. This renders the beams outdated and communication performance may thereby suffer.

The subject disclosure describes, among other things, illustrative embodiments of combined beamforming in which an RU is configured to generate beam(s) using (the latest) received uplink signal information (e.g., demodulation reference signal (DMRS) data), and selectively combine these beam(s) with beam(s) generated by a DU (e.g., based on SRS data) for uplink beamforming. In exemplary embodiments, combination of the differently generated beams may be in the form of simple concatenation, where the digital beamformer's multiplication matrix may be updated with the various beams. In a simple, example scenario where the matrix includes a first column for a first beam generated by the RU using DMRS data and a second column for a second beam generated by the DU using SRS data, the DU may (request and) obtain two streams from the RU—i.e., one generated using the DMRS-based beam and another generated using the SRS-based beam—and extract and use data from both streams so as to harvest the benefits of both DMRS (which might be a bit noisy, but is the most up-to-date) and SRS (which might be slightly dated, but is intensively processed by the DU to reduce noise/eliminate interference).

In various embodiments, and described in more detail herein, an artificial intelligence (AI)/machine learning (ML) compute system residing in a network (e.g., a RAN intelligent controller (RIC) or the like) may learn and adjust allocation of beam design responsibilities between a DU and an RU in accordance with performance indicator(s). Numerous factors can be used in the allocation decision-making, including user priority, user reliability/latency requirements and/or service level agreements, user channel conditions, user mobility, content type, fronthaul load, DU load, RU load, resource usage patterns, instantaneous user loading, and so on to optimize or improve load balancing in the fronthaul.

Exemplary embodiments described herein leverage the available compute resources of a DU and the presence of the most up-to-date uplink signal information in an RU to dynamically optimize or improve beamforming in uplink massive MIMO systems. The ability to effect combined beamforming is especially useful in distributed deployments of MIMO cellular base stations. Further, AI/ML compute systems in a radio network can control the optimization with minimal to no need for analysis or classification of deployment types and with minimal to no need for manual intervention. Other embodiments are described in the subject disclosure.

One or more aspects of the subject disclosure include a device having a processing system including a processor; and a memory that stores executable instructions that, when executed by the processing system, facilitate performance of operations including: receiving sounding reference signal (SRS) data for an uplink transmission of a user equipment (UE) from a remote unit (RU); generating SRS-based beam weights; transmitting the SRS-based beam weights to the RU; instructing the RU to generate DMRS-based beam weights and send demodulation reference signal (DMRS) channel estimates from subsequent uplink transmissions of the UE; and receiving the DMRS channel estimates from the RU.

One or more aspects of the subject disclosure include a non-transitory, machine-readable medium with executable instructions that, when executed by a processing system including a processor, facilitate performance of operations of receiving sounding reference signal (SRS) data for an uplink transmission of a user equipment (UE) from a remote unit (RU); generating SRS-based channel estimates from the SRS data; transmitting the SRS-based channel estimates to the RU; instructing the RU to calculate demodulation reference signal (DMRS) channel estimates from the SRS-based channel estimates and subsequent uplink transmissions of the UE; instructing the RU to provide the DMRS channel estimates; and processing the uplink transmission using the DMRS channel estimates received from the RU.

One or more aspects of the subject disclosure include a method of: receiving, by a processing system including a processor, sounding reference signal (SRS) data for an uplink transmission of a user equipment (UE) from a remote unit (RU); generating, by the processing system, SRS-based channel estimates from the SRS data; determining, by the processing system, whether to transmit the SRS-based channel estimates to the RU; responsive to a determination to transmit the SRS-based channel estimates to the RU, instructing, by the processing system, the RU to calculate demodulation reference signal (DMRS) channel estimates from the SRS-based channel estimates and subsequent uplink transmissions of the UE; instructing, by the processing system, the RU to provide the DMRS channel estimates; and processing, by the processing system, the uplink transmission using the DMRS channel estimates received from the RU.

Referring now to FIG. 1A, a block diagram is shown illustrating an example, non-limiting embodiment of a system 100 in accordance with various aspects described herein. For example, system 100 can facilitate, in whole or in part, combined beamforming, channel information transfer allocation, and reference signal compression for massive MIMO uplink enhancement in wireless RANs deployed with a fronthaul split or any other lower, physical layer split. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 1B:
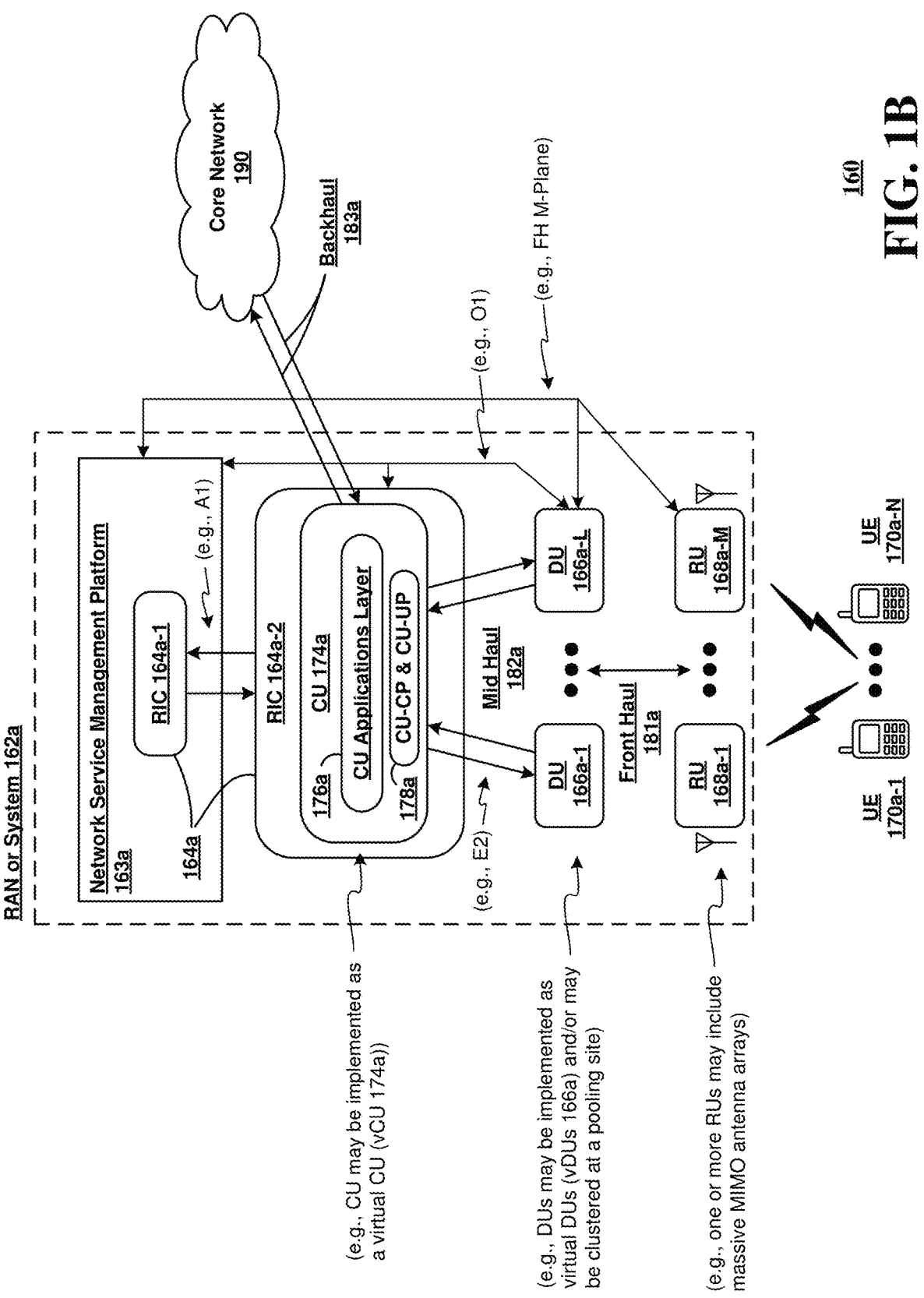
FIG. 1B is a block diagram illustrating an example, non-limiting embodiment of a system functioning within, or operatively overlaid upon, the communications network of FIG. 1A in accordance with various aspects described herein.

FIG. 1B is a block diagram illustrating an example, non-limiting embodiment of a system 160 functioning within, or operatively overlaid upon, the communications network 100 of FIG. 1A in accordance with various aspects described herein. For example, system 160 can, in whole or in part, facilitate combined beamforming, channel information transfer allocation, and reference signal compression for massive MIMO uplink enhancement in wireless RANs deployed with a fronthaul split or any other lower, physical layer split. In some embodiments, the system 160 may correspond to, or include one or more networks (e.g., a communications network, a data network, etc.).

As shown in FIG. 1B, the system 160 may include a RAN 162a communicatively coupled to a core network 190. The core network 190 can include a 5G network, an evolved packet core (EPC) network, a higher generation network, or any combination thereof. In various embodiments, the RAN 162a may be, or may include a virtual RAN (vRAN) (e.g., in an O-RAN implementation), in which software is decoupled from hardware, and implementation thereof is in accordance with principles of network function virtualization (NFV), where the control plane is separated from the data plane. The vRAN may include a centralized set of baseband units located remotely from antennas and remote radio units and may be configured to share signaling amongst cells.

As shown in FIG. 1B, the RAN 162a may include a network service management platform 163a and a RAN intelligent controller (RIC) 164a. The RIC 164a may include a RIC portion 164a-1 implemented, or otherwise incorporated, in the network service management platform 163a. The RIC 164a may include a RIC portion 164a-2 having a control or centralized unit (CU) 174a (e.g., a base station CU, such as a gNodeB (gNB) CU or the like) that provides a CU applications layer 176a as well as a CU control plane CU-CP and a CU user plane CU-UP (e.g., represented as CU-CP & CU-UP 178a). In various embodiments, the RIC portion 164a-1 may be configured to operate in non-real-time, and the RIC portion 164a-2 may be configured to operate in near real-time. The particular functions performed by the RIC portions 164a-1, 2 can vary based on various criteria, including implementing changing parameters or requirements for the network, and can also include redundancy and/or dynamic switching of functions (including functions described herein) between the RIC portions 164a-1, 2.

As shown in FIG. 1B, the RAN 162a may include distributed units (DUs) 166a-1 through 166a-L (L≥1) (hereinafter referred to collectively as "DUs 166a," and individually as "DU 166a"). In various embodiments, the DUs 166a may include baseband units (e.g., base station DUs, such as gNB DUs or the like) configured to perform signal processing, UE scheduling, and/or the like. In exemplary embodiments, each of one or more DUs 166a may be implemented as a virtual DU (vDU). The RAN 162a may also include remote radio heads or remote units (RUs) 168a-1 through 168a-M (M≥1) (hereinafter referred to collectively as "RUs 168a," and individually as "RU 168a"). The RUs 168a may communicatively couple (e.g., via an air interface) with user equipment (UEs) 170a-1 through 170a-N (N≥1) (hereinafter referred to collectively as "UEs 170a," and individually as "UE 170a"). In various embodiments, the RUs 168a may include remote radio units, antennas, and/or the like. In one or more embodiments, each of one or more RUs 168a may include one or more antenna arrays (e.g., massive MIMO arrays).

As shown in FIG. 1B, the RUs 168a, the DUs 166a, and the CU 174a may, by way of a fronthaul 181a, a midhaul 182a, and a backhaul 183a, provide (e.g., controlled) connectivity between the core network 190 and the UEs 170a. In one or more embodiments, the fronthaul 181a, the midhaul 182a, and/or the backhaul 183a may conform to open standards, such as O-RAN standards or the like. In certain embodiments, a given DU 166a may reside at a central location (away from cell towers) and may be communicatively coupled to multiple RUs (e.g., distributed across a geographic area) via a fronthaul 181a (split fronthaul).

Although FIG. 1B illustrates the CU 174a as being incorporated in the RIC portion 164a-2, in various embodiments, the CU 174a may be implemented as a distinct component from the RIC portion 164a-2. In some embodiments, the RIC 164a and the network service management platform 163a may operate as part of one or more central control planes that oversee a geographic region that can include multiple (e.g., hundreds, thousands, etc.) of remote units, distributed units, centralized units, or any combination thereof.

In various embodiments, the system 160 may be functionally separated or segmented in accordance with one or more time-based zones or frames. For example, the network service management platform 163a and/or the RIC portion 164a-1 may be operative at or in non-real-time; the RIC portion 164a-2 and/or the CU 174a may be operative at or in near-real-time; and the DUs 166a, the RUs 168a, and/or the UEs 170a may be operative at or in real-time. As the terms (and related terms) are used herein, real-time operations may occur over a span of fractions of a second up to a second (or the like), near-real-time operations may occur over the course of a few seconds (e.g., 1 to 5 seconds or the like), and non-real-time operations may occur over a time period that is greater than a few seconds (e.g., greater than 5 seconds or the like).

In various embodiments, the network service management platform 163a may manage, or otherwise adapt, RIC behaviors and/or operations across one or more of the three time zones or timeframes described above (e.g., real-time, near-real-time, and non-real-time) on an individualized and/or collective basis. Such management or adaptation of RIC behaviors and/or operations may conform to one or more models or microservices (e.g., artificial intelligence (AI) models or microservices), or network applications (e.g., rAPPs, xAPPs), as described herein. In turn, the RIC may establish and/or modify policies and/or behaviors of respective CUs, DUs, and RUs in accordance with the model(s) or microservice(s). In this regard, the network service management platform 163a may indirectly influence the behaviors and/or operations of CUs, DUs, and/or RUs via one or more RICs.

In some embodiments, the communication channels and/or links between the RAN 162a and the UEs 170a may include wireless links. In various embodiments, some or all of the UEs 170a may be mobile and may therefore enter and/or exit a service or coverage area associated with the RIC 164a. In various embodiments, some of the UEs 170a may include non-mobile or stationary devices. In some of these embodiments, the RAN 162a may include one or more routers, gateways, modems, cables, wires, and/or the like, and the communication channels and/or links between the RAN 162a and such UEs may include wired/wireline links, optical links, etc.

In various embodiments, a RIC (e.g., the RIC portions 164a-1, 2 of the RIC 164a) may store, execute, and/or deploy applications or microservices that are configured to control and manage a RAN (e.g., the RAN 162a). In one or more embodiments, for example, the RIC portion 164a-1 may store, execute, and/or deploy rApps, and the RIC portion 164a-2 may store, execute, and/or deploy xApps (e.g., in or via an applications layer, such as the CU applications layer 176a). The applications or microservices may relate to beam designing/forming responsibility allocation, scheduler capacity optimization, coverage optimization, capacity optimization (including, for example, via interference mitigation), user quality optimization (including, for example, for the UL and/or the DL), radio connection management, mobility management, quality-of-service (QoS) management, interference management, telemetry, network traffic control and/or management, device admissions (e.g., UE admissions control), and/or the like. In various embodiments, an application may include one or more models, such as AI (e.g., ML) models, that when executed in one or more containers, provide corresponding microservices. Deployment of an AI model in a RIC (or, more generally, a RAN) may involve, or include, for example, executing or instantiating the AI model in one or more containers in the RIC portion 164a-1 and/or the applications layer of the RIC portion 164a-2 (e.g., the CU applications layer 176a), such that the AI model processes inputs (e.g., received from other microservices running on the RIC and/or from various components of the RAN, such as the CU-CP & CU-UP 178a, the DUs 166a, and/or the RUs 168a) and provides outputs (e.g., to the other microservices and/or the various components of the RAN), in accordance with the AI model, to control the overall operation of the RAN.

It is to be appreciated and understood that the system 160 can include various quantities of cells (e.g., primary cells (Pcells) and/or secondary cells (Scells)), various quantities of network nodes in a cell, and/or several types of network nodes and/or cells (e.g., heterogeneous cells, etc.).

It is also to be appreciated and understood that the quantity and arrangement of systems, networks, platforms, controllers, controller portions, centralized units, applications layers, distributed units, remote units, fronthauls, midhauls, backhauls, and/or antenna arrays shown in FIG. 1B are provided as an example. In practice, there may be additional systems, networks, platforms, controllers, controller portions, centralized units, applications layers, distributed units, remote units, fronthauls, midhauls, backhauls, and/or antenna arrays than those shown in FIG. 1B. For example, the system 160 can include more or fewer systems, networks, platforms, controllers, controller portions, centralized units, applications layers, distributed units, remote units, fronthauls, midhauls, backhauls, and/or antenna arrays. Furthermore, two or more systems, networks, platforms, controllers, controller portions, centralized units, applications layers, distributed units, remote units, fronthauls, midhauls, backhauls, or antenna arrays shown in FIG. 1B may be implemented within a single system, network, platform, controller, controller portion, centralized unit, applications layer, distributed unit, remote unit, fronthaul, midhaul, backhaul, or antenna array shown in FIG. 1B or a single system, network, platform, controller, controller portion, centralized unit, applications layer, distributed unit, remote unit, fronthaul, midhaul, backhaul, or antenna array shown in FIG. 1B may be implemented as multiple, distributed systems, networks, platforms, controllers, controller portions, centralized units, applications layers, distributed units, remote units, fronthauls, midhauls, backhauls, or antenna arrays. Additionally, or alternatively, a set of systems, networks, platforms, controllers, controller portions, centralized units, applications layers, distributed units, remote units, fronthauls, midhauls, backhauls, and/or antenna arrays (e.g., one or more systems, networks, platforms, controllers, controller portions, centralized units, applications layers, distributed units, remote units, fronthauls, midhauls, backhauls, and/or antenna arrays) of the system 160 may perform one or more functions described as being performed by another set of systems, networks, platforms, controllers, controller portions, centralized units, applications layers, distributed units, remote units, fronthauls, midhauls, backhauls, and/or antenna arrays of the system 160.

Figure 1C:
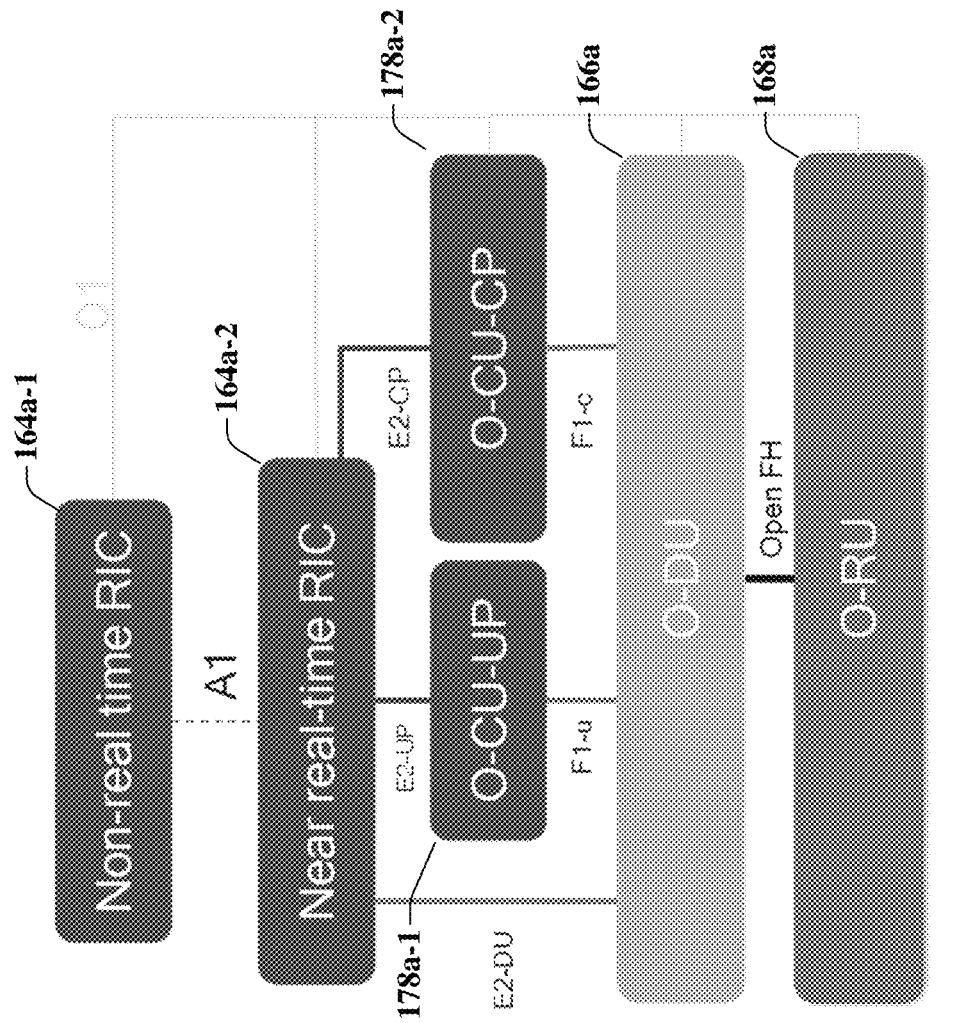
FIG. 1C is a block diagram illustrating an example, non-limiting embodiment of an exemplary O-RAN architecture functioning within, or operatively overlaid upon, the communications network of FIG. 1A in accordance with various aspects described herein.

FIG. 1C is a block diagram illustrating an example, non-limiting embodiment of an exemplary O-RAN architecture 170 functioning within, or operatively overlaid upon, the communications network 100 of FIG. 1A in accordance with various aspects described herein. Exemplary O-RAN architecture 170 comprises a non-real time RIC 164a-1, a near real-time RIC 164a-2, a CU user plane CU-UP 178a-1, a CU control plane O-CU-CP 178a-2, a O-RAN DU 166a and an O-RAN RU 168a. Near real time RIC 164a-2 (and/or real time RIC, depending on the application) can use the controls from the DU 166a and CU 178a-1 to create policies to send to the L2 scheduler at the DU 166a to be used for making decisions regarding the DMRS and SRS beamforming weights concatenation. For the FH UL Perf improvement, the controls can be the channel conditions (or a histogram of the channel quality information), or the traffic information/buffer/load per user, or the mobility information, the reliability/latency requirements, SLA per user etc., usage information, traffic patterns, etc. The policies will dictate how/whether to use the SRS at the DU 166a and the DMRS at the RU 168a to create the digital beamforming weights at the RU 168a for different paired users that are transmitting to the RUs. The policies can be weight allocations, number of streams per users, etc.

Figure 2A:
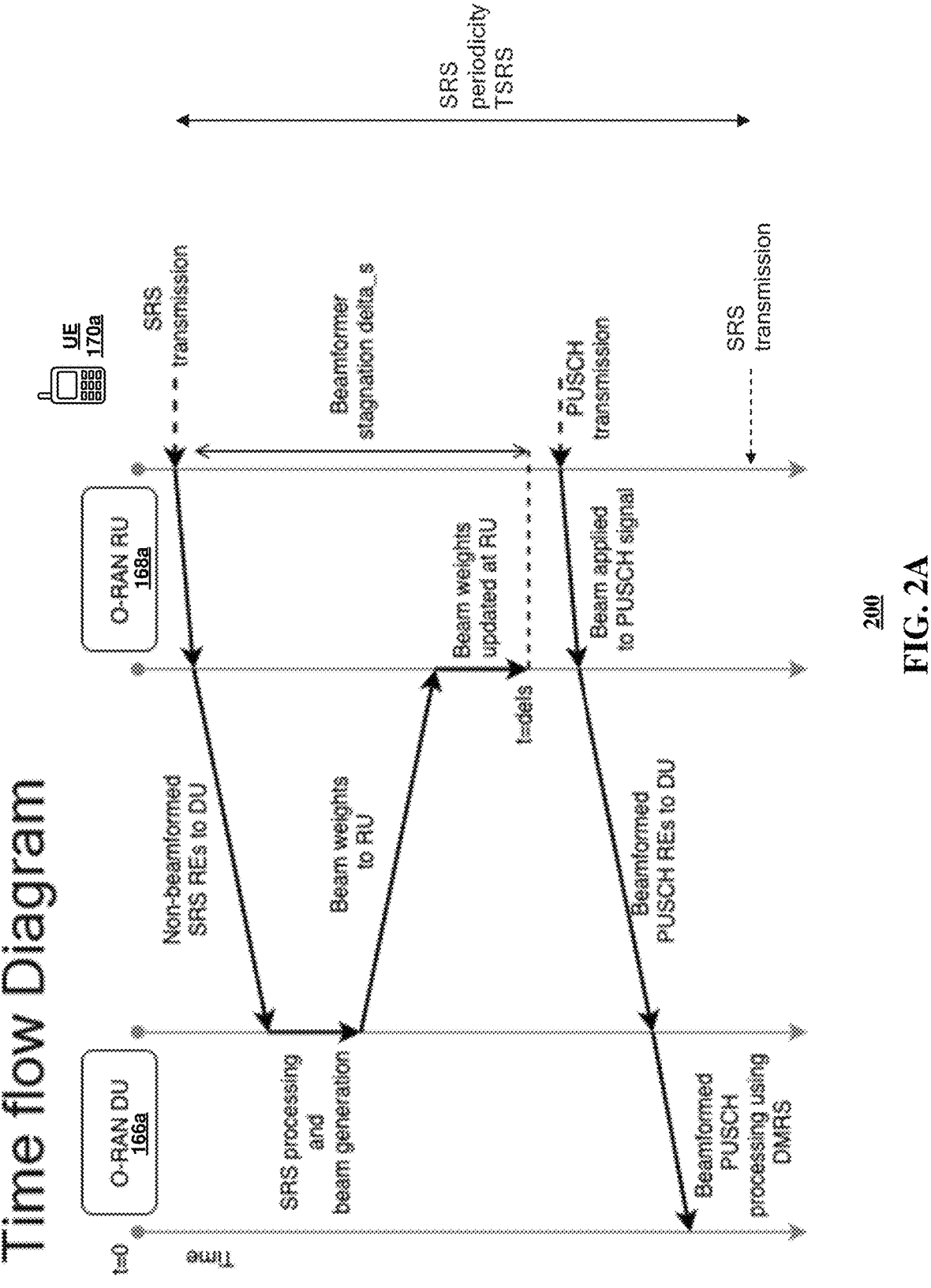
FIG. 2A is a timing diagram illustrating a process for beamforming from a sounding reference signal and a delay applying the beamforming to a physical resource shared channel uplink transmission.

FIG. 2A is a timing diagram illustrating a process 200 for beamforming from a sounding reference signal and a delay applying the beamforming to a physical resource shared channel (PUSCH) uplink transmission. As shown in FIG. 2A, at the outset of process 200, O-RAN RU 168a receives an SRS transmission from a UE 170a and provides this information to O-RAN DU 166a for processing and beam generation. In response, O-RAN DU 166a generates SRS-based beam weights and provides the beam weights to O-RAN RU 168a for use when receiving subsequent PUSCH transmissions from UE 170a. However, channel conditions may change during the time between O-RAN RU 168a receiving the SRS transmission and using the SRS-based beam weights at the RU beamformer for uplink reception of user data. This stagnation delay, labelled as delta_s, is known as "beam aging," which can be problematic in existing split RAN deployments. The back-and-forth (SRS receipt- and processing-related) delay experienced in conventional configurations can result in improper "steering" of beams in "directions" that are no longer valid if a given UE has moved to a different location or if other changing channel conditions (multipath, fading, etc.) occur in the interim.

Figure 2B:
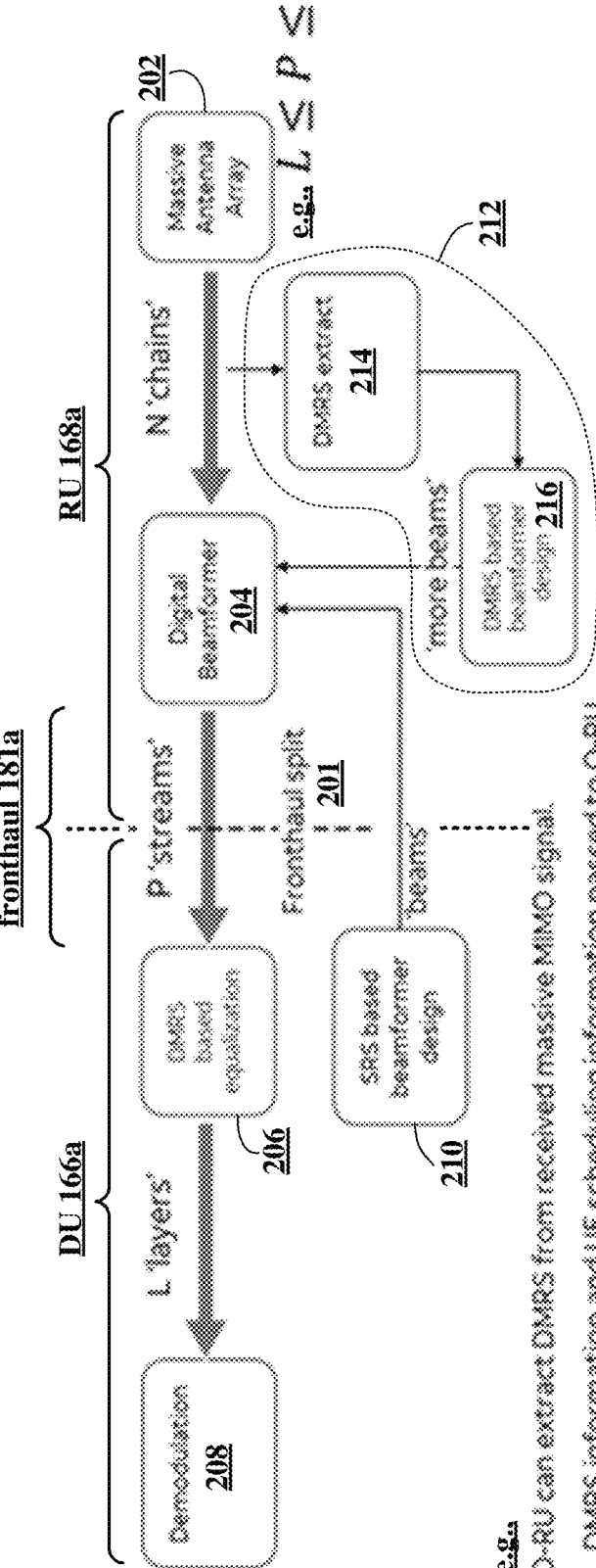
FIG. 2B is a block diagram illustrating an example, non-limiting embodiment of a system functioning within, or operatively overlaid upon, the communications network of FIG. 1A and/or the system of FIG. 1B in accordance with various aspects described herein.

FIG. 2B depicts a block diagram of an exemplary, non-limiting embodiment of a fronthaul split configuration 201 capable of providing combined beamforming, channel information transfer allocation, and reference signal compression for improved uplink performance in accordance with various aspects described herein. In various embodiments, the configuration may be included in, may function within, or may be operatively overlaid upon, the communications network 100 of FIG. 1A and/or the system 160 of FIG. 1B.

As shown in FIG. 2B, the fronthaul split configuration 201 may involve a DU 166a and an RU 168a. The DU 166a may be configured to provide various functions including, but not limited to, DMRS-based equalization 206, demodulation 208, and SRS-based beam designing 210. The RU 168a may include an antenna array 202 and may also be configured to provide a variety of functions, including, but not limited to, digital beamforming 204, DMRS extraction 214, and DMRS-based beam designing 216. It is to be appreciated and understood that each of the functions of the DU 166a and RU 168a may be implemented in any suitable manner—i.e., in hardware and/or software.

As depicted in FIG. 2B, the DU 166a may perform SRS-based beam designing (210) (based on SRS data previously received from a UE) and provide generated beams—i.e., beam weights or coefficients—to the RU 168a over a fronthaul 181a. These beams may enable digital "steering" of the antenna array 202 to facilitate capturing of the maximum amount of signal power in UE uplink transmissions. Digital "steering" may involve matrix multiplication where beam weights or coefficients control how the beams are formed. As shown, the RU 168a may update the digital beamformer 204 (matrix) with the beams and may apply digital beamforming on N 'chains' of user data (signals received by the antenna array 202 from one or more UEs) to derive P 'streams' of information. The P 'streams' may be transmitted over the fronthaul 181a to the DU 166a and undergo DMRS-based equalization (206), resulting in L 'layers' (corresponding to L data channels) sent by the UE(s). The DU 166a may then demodulate the L 'layers' to obtain the corresponding user data.

In an example scenario where the antenna array 202 includes 64 antennas, and where a UE sends two data channels (or layers) to the RU 168a, the value of P may be anywhere from 2 to 64—or, optionally, higher in cases where signal compression is performed on (e.g., each of the) beams, and thus additional columns (for additional 'streams') in the matrix of the digital beamformer 204 may carry additional information should different compression types be used for different columns. Where digital beamformer (204) reduces dimensionality of the antenna array 202 to P 'streams' that are less than or equal to N 'chains', the burden on the fronthaul 181a can be reduced.

In massive MIMO, it is important to relieve the fronthaul from the tasks of estimating numerous channels and achieving appropriate beamforming to maintain optimal uplink performance. As briefly described above, beam aging can be problematic in existing split RAN deployments. Configuring the RU 168a with additional functions 212 (including, e.g., DMRS extraction 214 and DMRS-based beamforming 216) can address the abovementioned beam aging problem, and further enable intelligent allocation of beam designing responsibilities between the DU 166a and the RU 168a.

In exemplary embodiments, the RU 168a configuration leverages DMRS information typically sent along with UE data transmissions to derive the most up-to-date beams for use with digital beamforming. In various embodiments, the RU 168a may extract (214) such DMRS information (from N 'chains'), perform channel estimation using the DMRS information, and design DMRS-based beams (216) (using known DMRS beam design algorithm(s) or the like) based on DMRS channel estimates. The RU 168a may then update the digital beamformer 204 with these beam outputs in conjunction with any SRS-based beams designed by and obtained from the DU 166a. For instance, the RU 168a may (e.g., based on a command from the DU 166a) use SRS-based beam(s) for certain column(s) of the digital beamformer 204's matrix, and use DMRS-based beam(s) for other column(s) of the matrix. In this way, the digital beamformer 204 can leverage the advantages offered by both SRS- and DMRS-based channel estimates to optimize or improve uplink performance. For instance, in an example scenario where the antenna array 202 includes 64 antennas, and where a given UE transmits a single data channel (or layer), the RU 168a may (e.g., based on a command from the DU 166a) utilize an SRS-based beam (generated by the DU 166a) in one column of the digital beamformer 204's matrix, and utilize a DMRS-based beam (generated by the RU 168a) in another column of the matrix, to derive two streams of data for use by the DU 166a. Here, the DU 166a can extract data from both streams and harvest the benefits of both DMRS (which might be a bit noisy but is the most up to date) and SRS (which might be slightly dated but is intensively processed by the DU to reduce noise/eliminate interference).

In exemplary embodiments, the DU 166a and/or an associated RIC (e.g., the RIC 164a of FIGS. 1B and 1C) configuration dynamically identifies the quantity of beams needed for a given UE and determines (and effects) appropriate allocation of beam generation responsibilities between the DU 166a and the RU 168a. In various embodiments, the DU 166a and/or the RIC 164a may derive performance measurement(s) based on examining uplink performance (e.g., signal to interference and noise ratio (SINR) and/or other metrics) associated with use of RU-generated beams (e.g., DMRS-based beams) as compared to DU-generated beams (e.g., SRS-based beams), and employ AI/ML algorithm(s) to determine the appropriate allocation of beam design responsibilities between the DU 166a and the RU 168a, such as the frequency of generating and transmitting beamforming data. This enables intelligent (and optimized or improved) load balancing across the fronthaul split configuration 201, where the burden of (e.g., SRS-based) beam generation on the DU 166a and transferring of generated (e.g., SRS-based) beams across the fronthaul 181a may be alleviated in situations where uplink performance is determined to be sufficient (e.g., where SINR and/or other metrics satisfy one or more thresholds), and where the DU 166a may instead be tasked with (e.g., SRS-based) beam generation and transmission of generated (e.g., SRS-based) beams over the fronthaul 181 in situations where uplink performance is determined to be insufficient (e.g., where SINR and/or other metrics do not satisfy the one or more thresholds).

In certain embodiments, where several RUs are geographically positioned close to one another such that a given UE's uplink transmissions are received by some or all of these RUs, a corresponding DU (and/or RIC) may, based upon identifying the RUs that are in communication with the UE, effect the aforementioned beam generation allocation across the identified RUs (e.g., in a joint fashion). Here, the DU may or may not be tasked with generating (e.g., SRS-based) beam(s), one or more of the identified RUs may be tasked with generating one or more (e.g., DMRS-based) beams from subsequent UL transmissions, and each of the various identified RUs may combine any DU-generated beam(s) with that RU's own generated beams to provide overall improved UL reliability for the UE.

In various embodiments, the aforementioned AI/ML algorithm(s) may include classifiers. In certain embodiments, the DU and/or the RIC may train the AI/ML algorithm(s) to perform beam designing/forming responsibility allocations. In some embodiments, the DU and/or the RIC may provide information regarding determined allocations as input to the AI/ML algorithm(s), which may learn to automate future determinations of allocations. For instance, the DU and/or the RIC may train a machine learning algorithm based on known inputs, such as particular user priorities, particular user reliability/latency requirements and/or service level agreements, particular user channel conditions, particular user mobility information, particular content types, particular load(s) on a fronthaul, particular load(s) on the DU, particular loads on the RU, certain network resource usage patterns, instantaneous user loading data, etc. and known outputs, such as beam designing/forming responsibility allocations (e.g., where the DU generates "m" beams based on SRS and the RU generates "n" beams based on DMRS for a given UE, where the DU generates x % of the matrix beams based on SRS and the RU generates a remainder of the matrix beams based on DMRS for a given UE, etc.). In one or more embodiments, the DU and/or the RIC may refine a machine learning algorithm based on feedback received from a user of the DU and/or the RIC and/or from one or more other devices (e.g., management device(s)). For example, the user of the DU and/or the RIC and/or one or more management devices may provide feedback indicating whether determinations of allocation determinations, made by the machine learning algorithm based on new inputs, are accurate and/or helpful. When the feedback indicates that a particular determination is accurate and/or helpful, the DU and/or the RIC may configure the machine learning algorithm to make determinations of allocation determinations based on the particular determination (e.g., to determine future allocations in a manner similar to that in which the particular determination was made). When the feedback indicates that a particular determination is not accurate or helpful, the DU and/or the RIC may configure the machine learning algorithm to avoid determining allocations in a manner in which the particular determination was made. In this way, the DU and/or the RIC can determine allocations based on a machine learning algorithm, which improves the accuracy of the determinations, and conserves processor and/or storage resources that may otherwise be used to generate and store rules for determining allocations.

As an example, in a case where the DU 166a (and/or the RIC 164a) determines (e.g., using the AI/ML algorithm(s)) that a current load on the fronthaul 181a satisfies a threshold (e.g., is equal to or greater than a threshold value), the DU 166a (and/or the RIC 164a) may (e.g., using the AI/ML algorithm(s)) allocate beam generation responsibilities such that the RU 168a generates some or all of the beams and the DU 166a generates few to none of the beams. Continuing the example, in a different case where the DU 166a (and/or the RIC 164a) determines (e.g., using the AI/ML algorithm (s)) that the current load on the fronthaul 181a does not satisfy the threshold (e.g., is less than the threshold value), the DU 166a (and/or the RIC 164a) may (e.g., using the AI/ML algorithm(s)) allocate beam generation responsibilities such that the RU 168a generates few to none of the beams and the DU 166a generates some or all of the beams.

As some other examples, the DU 166a (and/or the RIC 164a) may (e.g., using the AI/ML algorithm(s)) allocate beam generation responsibilities based on user priority (e.g., where beamforming may be effected based on both DMRS- and SRS-based beams if a user priority satisfies (e.g., exceeds) a threshold or where beamforming may be effected based on only SRS-based beams or only DMRS-based beams if a user priority does not satisfy (e.g., does not exceed) the threshold), based on user reliability/latency requirements and/or service level agreements (e.g., where beamforming may be effected based on both DMRS- and SRS-based beams if a UE is associated with a first responder or where beamforming may be effected based on only SRS-based beams or only DMRS-based beams for other UEs not associated with a first responder), user channel conditions and/or mobility (e.g., where beamforming may be effected based on both DMRS- and SRS-based beams if a change in channel condition or a speed of movement of a UE satisfies (e.g., exceeds) one or more thresholds or where beamforming may be effected based on only SRS-based beams or only DMRS-based beams if a change in channel condition or a speed of movement of a UE does not satisfy (e.g., does not exceed) the one or more thresholds), content type (e.g., where beamforming may be effected based on both DMRS- and SRS-based beams if the content type for a UE is of a certain type or where beamforming may be effected based on only SRS-based beams or only DMRS-based beams if the content type for a UE is not of the certain type), etc.

Figure 2C:
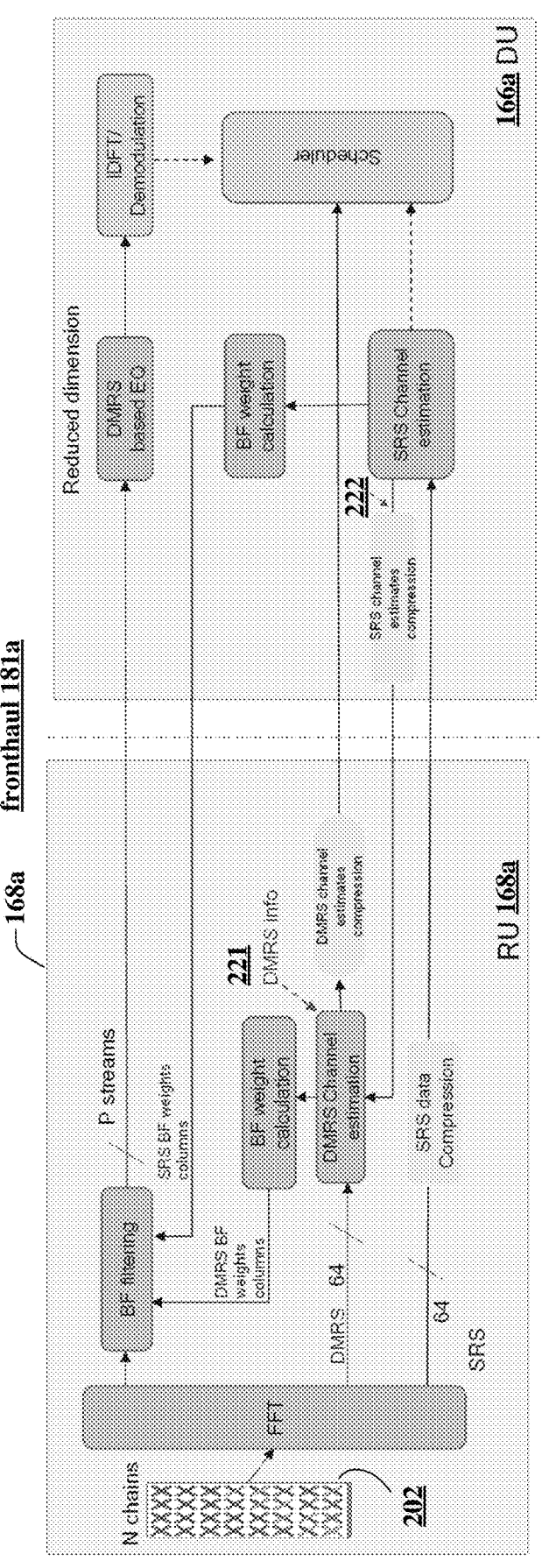
FIG. 2C depicts a block diagram of an exemplary, non-limiting embodiment of a fronthaul split configuration capable of judicially using the SRS and DMRS estimates transfer between the RU and the DU, depending on the user information and conditions, to optimize the use of the fronthaul in accordance with various aspects described herein.

FIG. 2C depicts a block diagram of an exemplary, non-limiting embodiment of a fronthaul split configuration 220 capable of judicially using the SRS and DMRS estimates that are transferred between the RU and the DU, depending on the user information and conditions, to optimize the use of the fronthaul in accordance with various aspects described herein. In various embodiments, DMRS and SRS channel estimates may be exchanged between a DU and an RU to facilitate generation of optimal or improved (or "good") beams. In this way, DU 166a can leverage DMRS information 221 (which can include DMRS resource elements and/or DMRS channel estimates) to optimize or improve its SRS-based beam generation, and RU 168a can similarly leverage SRS information 222 (e.g., SRS channel estimates) to optimize or improve its DMRS-based beam generation.

In the case of DMRS channel estimates 221, DU 166a can send a request for compressed channel estimates from RU 168a for UE channels that have strict reliability and latency requirements. DU 166a does not have to request DMRS channel estimates 216 for UEs that do not have such high reliability requirements. The DMRS channel estimates 221 that are compressed and sent by RU 168a can be a result of the policy from the RIC for these particular UEs, based on controls such as channel conditions, mobility information, reliability, latency, 5G QoS identifier (5QI), etc.

In the case of SRS information 222 compressed by DU 166a and sent back to RU 168a, DU 166a can decide whether to send this information back to RU 168a for those UEs that have stringent latency and reliability requirements. On the other hand, DU 166a can also decide not to send any compressed channel estimates back.

DU 166a can make the decisions about the exchange of DMRS channel estimates 221 and SRS information 222 over the fronthaul separately or jointly with RU 168a. A joint optimization can be based on maximizing the UL performance metrics (average throughput, cell edge throughput, other metrics for distinct types of traffic and diverse types of users), with an overall constraint on fronthaul capacity and overhead, taking into account user loading, traffic patterns, traffic trend information, etc.

Depending on the network or computational load, benefits from the exchange of DMRS and SRS channel estimates can come at the cost of spent fronthaul 181a throughput. Thus, the exchanges and processing utilization may need to be weighed against any potential communication performance gains that might come from beamforming improvement.

In various embodiments, fronthaul 181a throughput may be flexibly optimized or improved based on intelligent selection of physical control data, given a large antenna space. To optimize or improve usage of fronthaul 181a capacity, in an embodiment, DU 166a (and/or a RIC) may be configured to instruct RU 168a to enable or disable calculation and/or transmission of DMRS channel estimates 221 from the RU. In another embodiment, DU 166a and/or RIC may be configured to enable or disable transmission of SRS information 222 (e.g., channel estimates) to the RU. Additionally, or alternatively, DU 166a (and/or the RIC) may be configured to determine how frequently DMRS channel estimates 221 are received from an RU and/or determine how frequently SRS information 222 is transmitted to the RU. Further, DU 166a (and/or the RIC) may additionally, or alternatively, be configured to determine which UE(s) require RU 168a to determine and transmit DMRS channel estimates 221. Further, DU 166a (and/or the RIC) may additionally, or alternatively, be configured to determine the UE(s) for which SRS information 222 is to be transmitted to the RU. Some or all of these aforementioned determinations may be performed using AI/ML algorithm(s) based one or more inputs, including, for example, data regarding high-priority uplink transmissions, user reliability/latency requirements and/or service level agreements, user channel conditions, user mobility, content type, load on the fronthaul, load on the DU, load on the RU, network resource usage patterns, instantaneous user loading, etc.

In this way, DU 166a (and/or RIC) can control how much channel estimate information is provided to an RU for the RU to improve its beamforming algorithm and how much channel estimate information it receives from the RU for the DU to improve its own beamforming algorithm.

Exemplary embodiments thus provide a novel mechanism for an O-RAN DU (and/or RIC) to adjust the amount of control information that passes between the DU and an RU, which can maximize the use of available fronthaul 181a capacity in the face of changing network load scenarios. Fronthaul 181a capacity can be preserved as needed, and compression may be applied to certain control information accordingly.

Figure 2D:
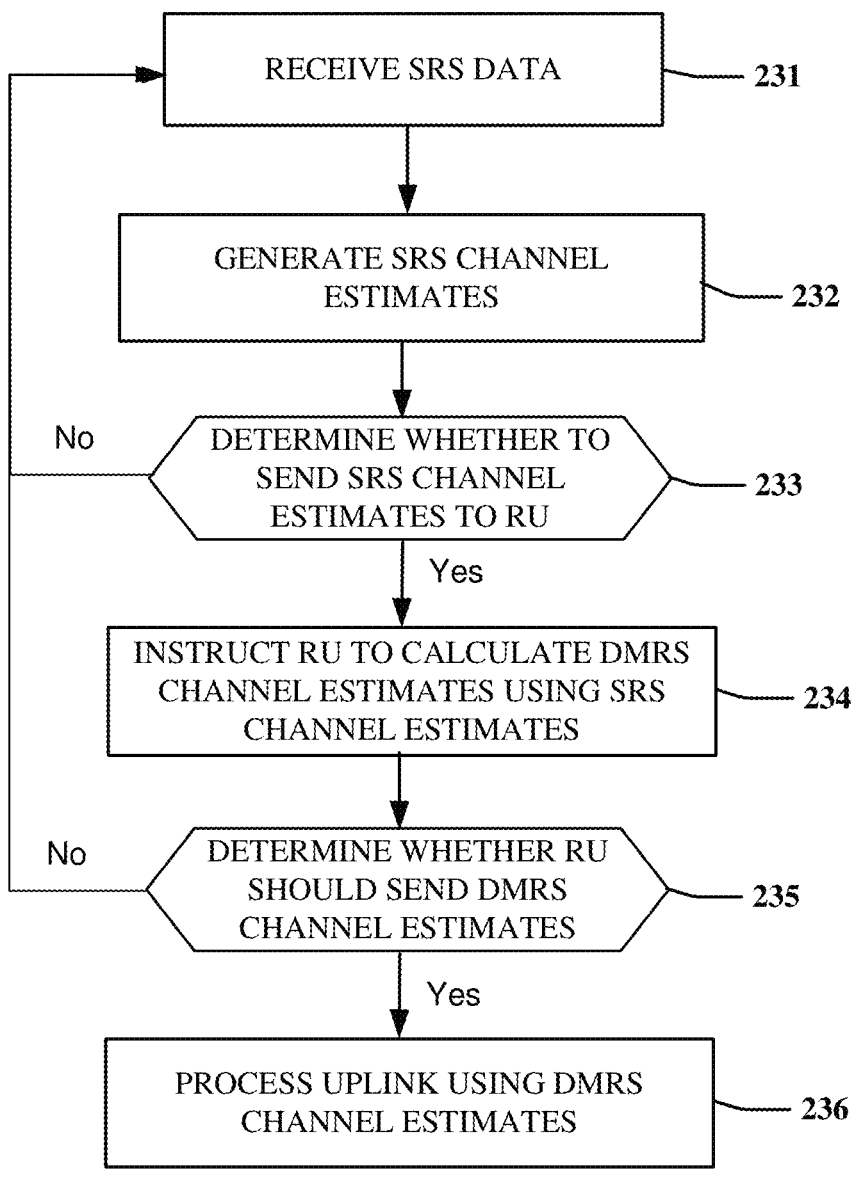
FIG. 2D depicts an illustrative embodiment of a method of managing a fronthaul split configuration for transferring SRS and DMRS channel estimates between a RU and a DU in accordance with various aspects described herein.

FIG. 2D depicts an illustrative embodiment of a method of managing a fronthaul split configuration for transferring SRS and DMRS channel estimates between a RU and a DU in accordance with various aspects described herein. As shown in FIG. 2D, method 230 begins at step 231 where a DU receives SRS channel data generated by the RU. Next in step 232, the DU (or RIC) generates SRS channel estimates from the data received from the RU. Then in step 233, the DU or RIC determine whether to send the SRS-based channel estimates to the RU. As mentioned above, the determination may be based on a wide variety of factors including user priority, user reliability requirements, user latency requirements, service level agreements, user channel conditions, user mobility, content type, communication load on a fronthaul, a first load on the device, a second load on the RU, network resource usage patterns, instantaneous user loading, or a combination thereof.

Next, in step 234, the system instructs the RU to calculate DMRS channel estimates using the SRS-based channel estimates if the determination results in sending the SRS-based channel estimates to the RU. Then in step 235, the system determines whether receiving DMRS channel estimates from the RU would be beneficial. If so, then the system instructs the RU to send the DMRS channel estimates and in step 236, uses the DMRS channel estimates to process the uplink data.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
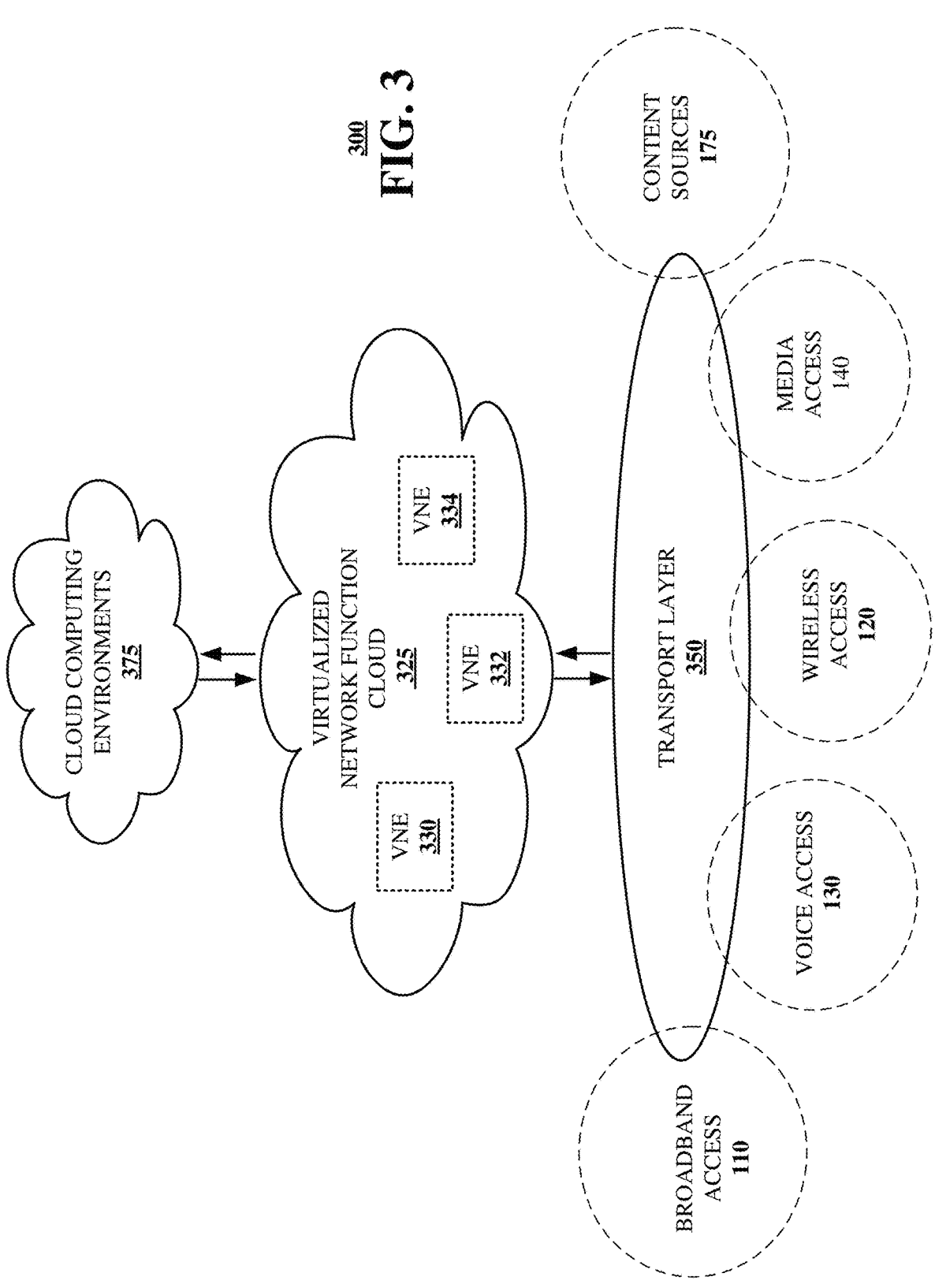
FIG. 3 is a block diagram illustrating an example, non-limiting embodiment of a virtualized communications network in accordance with various aspects described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100 of FIG. 1A, the subsystems and functions of system 160 of FIG. 1B, the subsystems and functions of the system of FIG. 2B-2D. For example, virtualized communications network 300 can facilitate, in whole or in part, combined beamforming, channel information transfer allocation, and reference signal compression for massive MIMO uplink enhancement in wireless RANs deployed with a fronthaul split or any other lower, physical layer split.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1A), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
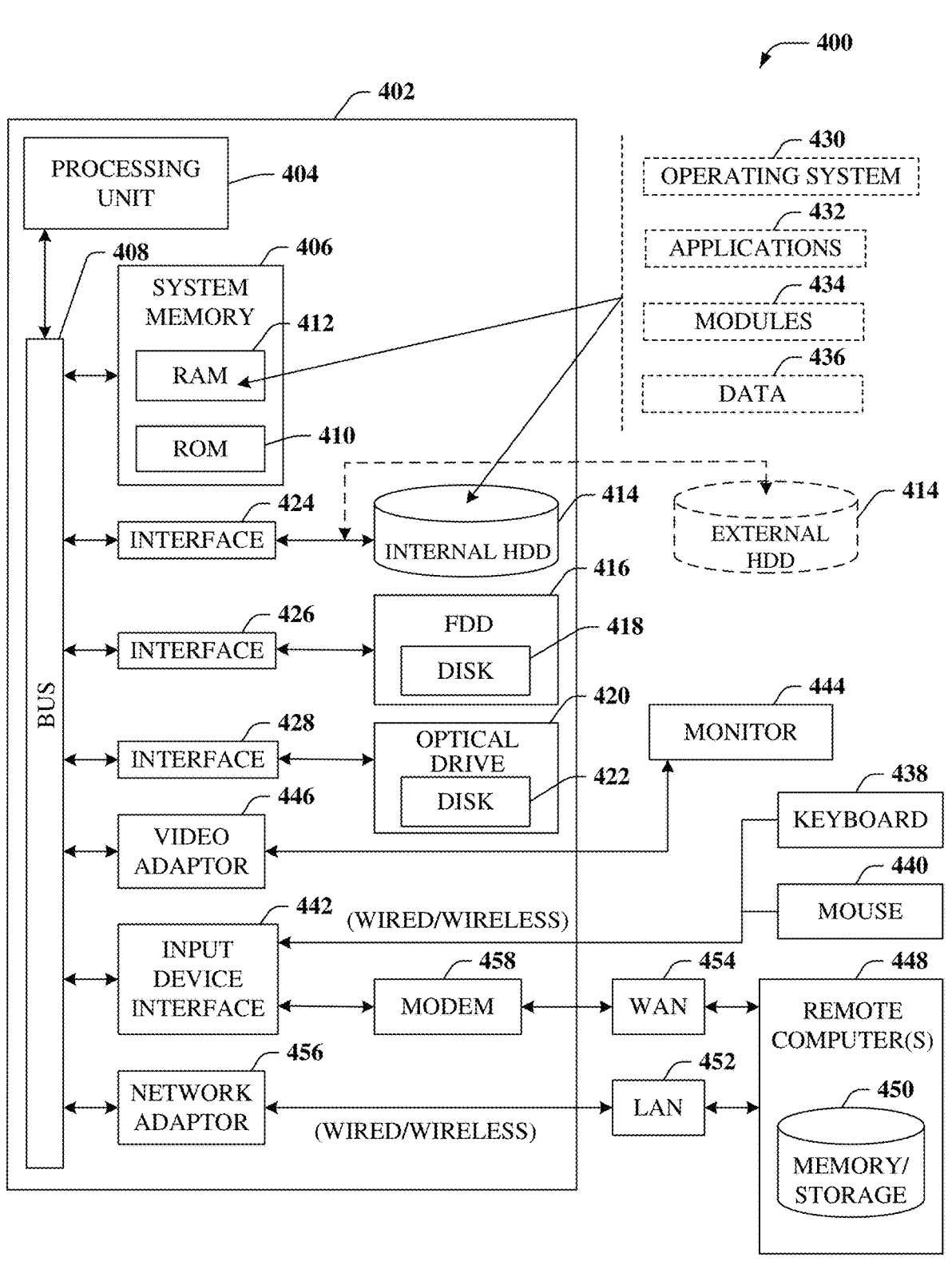
FIG. 4 is a block diagram of an example, non-limiting embodiment of a computing environment in accordance with various aspects described herein.

Turning now to FIG. 4, there is illustrated a block diagram of a computing environment in accordance with various aspects described herein. To provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, combined beamforming, channel information transfer allocation, and reference signal compression for massive MIMO uplink enhancement in wireless RANs deployed with a fronthaul split or any other lower, physical layer split.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/ or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
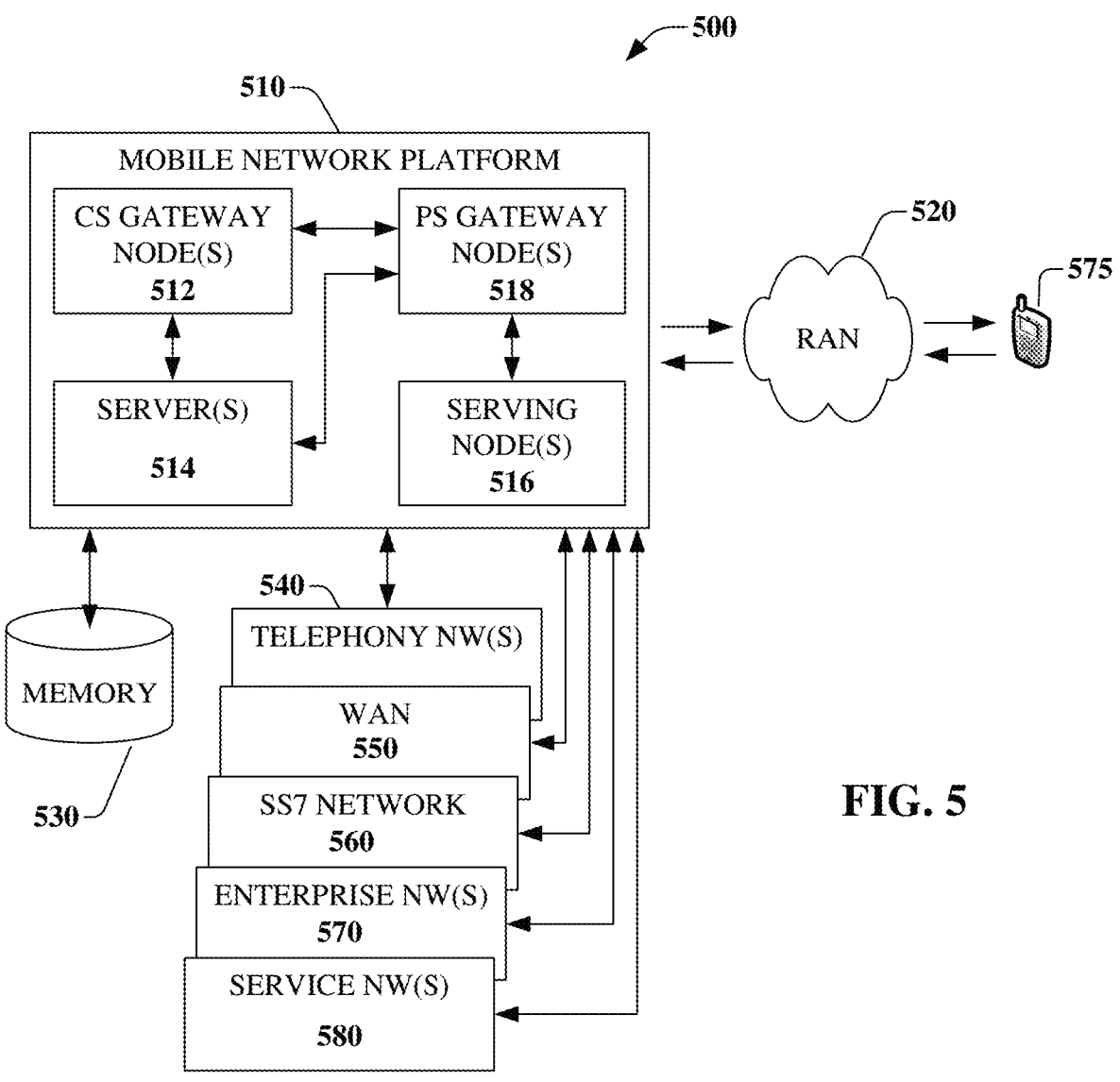
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, combined beamforming, channel information transfer allocation, and reference signal compression for massive MIMO uplink enhancement in wireless RANs deployed with a fronthaul split or any other lower, physical layer split. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

To provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
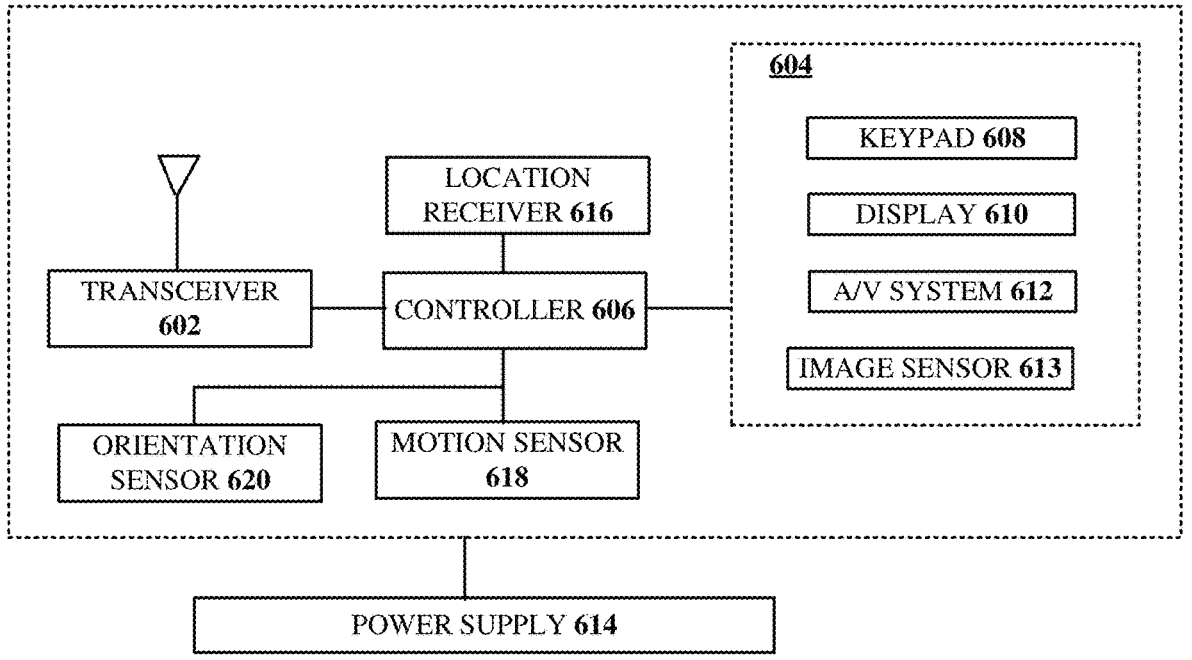
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via communications network 125. For example, computing device 600 can facilitate, in whole or in part, combined beamforming, channel information transfer allocation, and reference signal compression for massive MIMO uplink enhancement in wireless RANs deployed with a fronthaul split or any other lower, physical layer split.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage, "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for conducting various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving sounding reference signal (SRS) data for an uplink transmission of a user equipment (UE) from a remote unit (RU);
determining a signal to interference and noise ratio (SINR) associated with an SRS from the SRS data resulting in a first determination;
based on the first determination, determining that the SINR does not satisfy an SRS SINR threshold resulting in a second determination;
based on the second determination, generating SRS-based beam weights;
transmitting the SRS-based beam weights to the RU;
instructing the RU to generate DMRS-based beam weights and send demodulation reference signal (DMRS) channel estimates from subsequent uplink transmissions of the UE; and
receiving the DMRS channel estimates from the RU.

2. The device of claim 1, wherein beam weights formed at the RU comprise the DMRS-based beam weights generated at the RU and the SRS-based beam weights transmitted to the RU.

3. The device of claim 2, wherein the operations further comprise: performing a third determination of how many beam weights are DMRS-based and how many beam weights are SRS-based.

4. The device of claim 1, wherein the operations further comprise: performing a fourth determination of whether to instruct the RU to calculate DMRS channel estimates based on a throughput of the RU.

5. The device of claim 4, wherein the fourth determination weighs potential communication performance gains against additional network and/or computational load on the throughput of the RU.

6. The device of claim 5, wherein the fourth determination is performed using an artificial intelligence (AI)/machine learning (ML) algorithm.

7. The device of claim 6, wherein the AI/ML algorithm performs the fourth determination based on inputs comprising data regarding user priority, user reliability requirements, user latency requirements, service level agreements, user channel conditions, user mobility, content type, communication load on a fronthaul, a first load on the device, a second load on the RU, network resource usage patterns, instantaneous user loading, or a combination thereof.

8. The device of claim 1, wherein the UE comprises high-priority uplink transmissions.

9. The device of claim 1, wherein the operations further comprise: determining a frequency of generating and transmitting SRS-based beam weights to the RU.

10. The device of claim 1, wherein the operations further comprise: determining a frequency of generating DMRS-based beam weights and transmitting DMRS channel estimates; and transmitting the frequency to the RU.

11. The device of claim 1, wherein the processing system comprises a plurality of processors operating in a distributed computing environment.

12. A non-transitory, machine-readable medium, comprising executable instructions that, when executed by a processing system including a processor, facilitate performance of operations, the operations comprising:

receiving sounding reference signal (SRS) data for an uplink transmission of a user equipment (UE) from a remote unit (RU);

determining a signal to interference and noise ratio (SINR) associated with an SRS from the SRS data resulting in a first determination;

based on the first determination, determining that the SINR does not satisfy an SRS SINR threshold resulting in a second determination;

based on the second determination, generating SRS-based channel estimates from the SRS data;

transmitting the SRS-based channel estimates to the RU;

instructing the RU to calculate demodulation reference signal (DMRS) channel estimates from the SRS-based channel estimates and subsequent uplink transmissions of the UE;

instructing the RU to provide the DMRS channel estimates; and processing the uplink transmission using the DMRS channel estimates received from the RU.

13. The non-transitory, machine-readable medium of claim 12, wherein the operations further comprise: performing a third determination of whether to instruct the RU to calculate and provide the DMRS channel estimates based on a throughput of the RU.

14. The non-transitory, machine-readable medium of claim 13, wherein the third determination weighs potential communication performance gains against additional network and/or computational load on the throughput of the RU.

15. The non-transitory, machine-readable medium of claim 13, wherein the third determination is performed using an artificial intelligence (AI)/machine learning (ML) algorithm.

16. The non-transitory, machine-readable medium of claim 15, wherein the AI/ML algorithm performs the third determination based on inputs comprising data regarding user priority, user reliability requirements, user latency requirements, service level agreements, user channel conditions, user mobility, content type, communication load on a fronthaul, a first load on the processing system, a second load on the RU, network resource usage patterns, instantaneous user loading, or a combination thereof.

17. The non-transitory, machine-readable medium of claim 12, wherein the UE comprises high-priority uplink transmissions.

18. The non-transitory, machine-readable medium of claim 12, wherein the processing system comprises a plurality of processors operating in a distributed computing environment.

19. A method, comprising:

receiving, by a processing system including a processor, sounding reference signal (SRS) data for an uplink transmission of a user equipment (UE) from a remote unit (RU);

determining, by the processing system, a signal to interference and noise ratio (SINR) associated with an SRS from the SRS data resulting in a first determination;

based on the first determination, determining, by the processing system, that the SINR does not satisfy an SRS SINR threshold resulting in a second determination;

based on the second determination, generating, by the processing system, SRS-based channel estimates from the SRS data;

determining, by the processing system, whether to transmit the SRS-based channel estimates to the RU resulting in a third determination;

responsive to the third determination to transmit the SRS-based channel estimates to the RU, instructing, by the processing system, the RU to calculate demodulation reference signal (DMRS) channel estimates from the SRS-based channel estimates and subsequent uplink transmissions of the UE;

instructing, by the processing system, the RU to provide DMRS channel estimates; and processing, by the processing system, the uplink transmission using the DMRS channel estimates received from the RU.

20. The method of claim 19, wherein the third determination is based on data regarding user priority, user reliability requirements, user latency requirements, service level agreements, user channel conditions, user mobility, content type, communication load on a fronthaul, a first load on the processing system, a second load on the RU, network resource usage patterns, instantaneous user loading, or a combination thereof.

\* \* \* \* \*